United States Patent [19]
Alten et al.

[11] Patent Number: 5,640,733
[45] Date of Patent: Jun. 24, 1997

[54] LOADING BRIDGE FOR RAMPS

[75] Inventors: Kurt Alten, Ringstr. 14, D-30974 Wennigsen; Horst Borchardt, Wennigsen, both of Germany

[73] Assignee: Kurt Alten, Wennigsen, Germany

[21] Appl. No.: 405,904

[22] Filed: Mar. 17, 1995

[30] Foreign Application Priority Data

Mar. 18, 1994 [DE] Germany .................... 44 09 346.2

[51] Int. Cl.⁶ ................................................ E01D 15/127
[52] U.S. Cl. ............................ 14/69.5; 14/71.3; 14/71.1
[58] Field of Search ................................ 14/69.5, 71.1, 14/71.3, 71.5, 71.7

[56] References Cited

U.S. PATENT DOCUMENTS 5,323,503  6/1994  Springer ................................. 14/71.3

*Primary Examiner*—Stephen J. Novosad
*Assistant Examiner*—Pamela A. O'Connor
*Attorney, Agent, or Firm*—Robert W. Becker & Associates

[57] ABSTRACT

The loading bridge for ramps has a bridge plate having a forward and a rearward end. It is connected with the rearward end to the ramp so as to be pivotable about a horizontal axis. An extension connected to the forward end of the bridge plate is provided and is extendable from an initial position into an extended position for supporting the bridge plate on a vehicle to be loaded and unloaded and retractable from the extended position into the initial position. At least one support leg with an upper and a lower end for supporting the bridge plate in a rest position is provided. The support leg is pivotably connected with the upper end to the bridge plate such that the lower end swivels upwardly toward the rearward end of the bridge plate when the extension is extended. The support leg has a positioning lever. The extension has a downwardly projecting beam. Upon extending the extension the positioning lever is loaded by the downwardly projecting beam such that the positioning lever is pivoted together with the support leg into a folded position. In the folded position the positioning lever rests on the downwardly projecting beam. The downwardly projecting beam has such a length that the support leg is secured against returning into the rest position over the entire travel length of the extension from the initial position into the extended position.

13 Claims, 1 Drawing Sheet

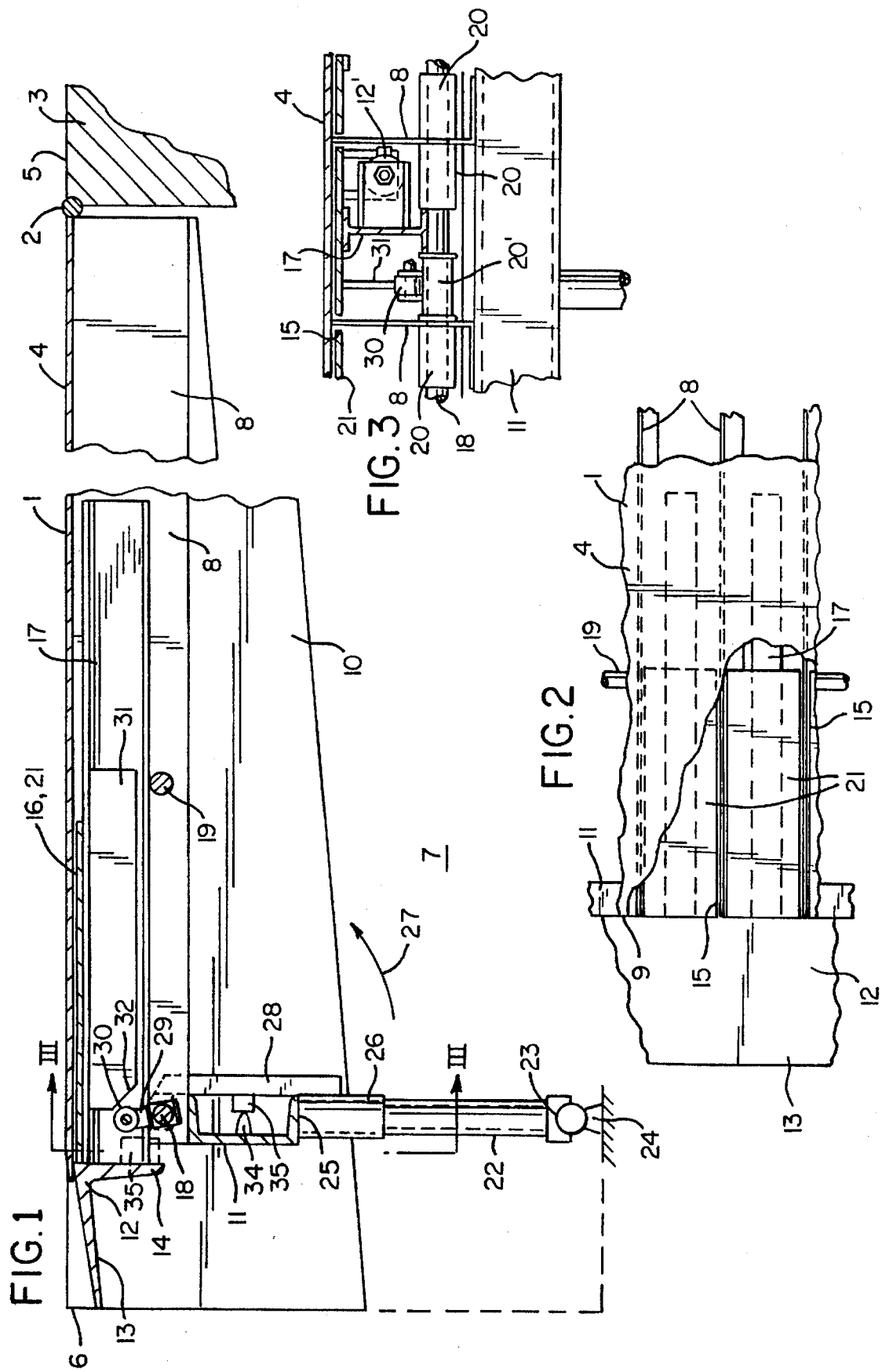

5,640,733

LOADING BRIDGE FOR RAMPS

BACKGROUND OF THE INVENTION

The present invention relates to a loading bridge for ramps with a bridge plate that, with one end facing the ramp, is supported so as to be pivotable about a horizontal axle at the ramp and is reinforced by longitudinal bearing members. At its free end the bridge plate has an extension that is displaceable in the longitudinal direction of the bridge and can be extended and retracted for supporting the bridge plate on the vehicle that is to be loaded or unloaded. The loading bridge is furthermore provided with one or more support legs for supporting the bridge in its rest position; the support legs can be swiveled about a horizontal axis such that the lower end of the support legs can swivel toward the rearward end of the loading bridge facing the ramp.

With known loading bridges of this kind the support legs are actuated and swiveled via a linkage that is actuated by the extension when it is extended. Apart from the fact that such linkages are susceptible to failures there is the risk that the linkage may be damaged when the support legs, being already swiveled, are forced to undergo a further swiveling movement, e.g. by a further lowering of the bridge plate or by foreign bodies beneath the bridge plate.

It is therefore an object of the present invention to improve these disadvantages. Accordingly, a particularly reliable swiveling of the support legs shall be achieved; however, it shall be ensured that even when a swiveling movement of the support legs, as a result of extending the extension, has already been carried out, a further swiveling movement of the support legs is possible with no difficulties.

SUMMARY OF THE INVENTION

The loading bridge for ramps according to the present invention is primarily characterized by:

- a bridge plate having a forward and a rearward end and connected with the rearward end to the ramp so as to be pivotable about a horizontal axis;
- an extension connected to the forward end of the bridge plate so as to be extendable from an initial position into an extended position for supporting the bridge plate on a vehicle to be loaded and unloaded and retractable from the extended position into the initial position;
- at least one support leg with an upper and a lower end for supporting the bridge plate in a rest position, the at least one support leg pivotably connected with the upper end to the bridge plate such that the lower end swivels upwardly toward the rearward end of the bridge plate when the extension is extended;
- the at least one support leg comprising a positioning lever and the extension comprising a downwardly projecting beam, wherein upon extending the extension the positioning lever is loaded by the downwardly projecting beam such that the positioning lever is pivoted together with the at least one support leg into a folded position;
- wherein in the folded position the positioning lever rests on the downwardly projecting beam; and
- wherein the downwardly projecting beam has such a length that the at least one support leg is secured against returning into the rest position over the entire travel length of the extension from the initial position into the extended position.

Preferably, the loading bridge comprises at least two support legs and further comprises a transverse shaft extending parallel to the forward and the rearward ends of the bridge plate. The positioning lever is advantageously connected to the transverse shaft and the at least two support legs are fixedly connected to the transverse shaft.

Expediently, the downwardly projecting beam is in the form of a bar.

In a preferred embodiment of the present invention, the downwardly projecting beam extends in the longitudinal direction of the bridge plate and comprises a slanted contact section for engaging the positioning lever.

Advantageously, the positioning lever has a free end with a roller.

The loading bridge preferably further comprises a cross beam positioned at the forward end of the bridge plate for stiffening the loading bridge. The transverse shaft is supported at the cross beam.

The loading bridge when comprising two support legs has the positioning lever positioned centrally on the transverse shaft. A first one of the support legs is connected to one end of the transverse shaft and a second one of the support legs is connected to the other end of the transverse shaft.

In the folded position a pressing of the positioning lever against the downwardly projecting beam is achieved substantially by the weight force of the at least one support leg.

In the rest position of the at least one support leg the positioning lever extends substantially parallel to the at least one support leg on a side of the transverse shaft opposite the at least one support leg.

The length of the downwardly projecting beam is at least equal to the travel length of the extension from the initial position into the extended position.

Preferably, a stop for the positioning lever is provided. The stop is connected to the extension on a side of the positioning lever remote from the downwardly projecting beam, wherein the stop, upon retracting the extension, impacts the positioning lever and pivots the positioning lever such that the at least one support leg is returned from the folded position into the rest position. The stop is preferably an elastic stop.

The extension expediently comprises a rearward, vertical leg and wherein the stop is connected to a the rearward, vertical leg.

According to the present invention the support legs are connected to a positioning lever and the extension is connected to a projecting beam such that, when the extension is extended, the positioning lever is acted upon by the projecting beam and is swiveled together with the support leg; the positioning lever rests loosely on the projecting beam that is provided with such a length that the support legs are thereby prevented from swiveling back into the rest position along the entire travel length of the extension from the initial position to the extended position.

Each support leg can be provided with a respective positioning lever—advantageously, however, only one positioning lever and one projecting beam are expediently provided beneath the bridge plate, centrally at its front end. In this case the positioning lever is fixedly connected to the transverse shaft that extends transverse to the bridge plate; one or more support legs can then be fixedly connected to the transverse shaft. The transverse shaft, in this case, is the transfer element between the positioning lever and the support legs which can be provided in any desired number.

Since no fixed, but only a loose connection is provided between the positioning lever and the projecting beam that is fastened to the extension, the support legs cannot return into the rest position; however, they may carry out an even greater swiveling movement in the direction of the folded position.

The projecting beam to be provided at the extension can be designed in the shape of a bar. In any way a slanted contact section should be provided that ensures a shockless contact of the positioning lever that is preferably provided with a roller at its free end. Thus, also a strip can be employed that has a slanted contact section at its front end, the length of the bar or strip has to correspond to the travel length of the extension from the initial to the extended position.

BRIEF DESCRIPTION OF THE DRAWINGS

The object and advantages of the present invention will appear more clearly form the following specification in conjunction with the accompanying drawings, in which:

FIG. 1 illustrates a loading bridge for ramps in its rest position, in a longitudinal sectional view;

FIG. 2 illustrates a partial plan view of the bridge according to FIG. 1; and

FIG. 3 illustrates a cross-section, viewed along line III—III of FIG. 1.

DESCRIPTION OF PREFERRED EMBODIMENTS

The present invention will now be described in detail with the aid of several specific embodiments utilizing FIGS. 1–3.

With its rearward end facing the ramp, the bridge plate is pivotable about a horizontal axle 2 that is supported at the ramp 3. In the rest position its sheet metal cover 4 is flush with the surface 5 and the front edge 6 of the ramp 3. At the ramp 3 a cutaway portion 7 is provided that corresponds to the size of the bridge plate 1 and into which the bridge plate 1 can be retracted. For swiveling the bridge plate 1, working cylinders are required which are not illustrated.

For reinforcing the bridge plate 1, a number of bearing members 8 is provided which extend to the forward end of the bridge plate 1. The bridge plate 1 is shielded on both sides by metal side plates 10 which have an essentially triangular shape. They are designed for anchoring a cross beam 11 on which the bearing members 8 rest. At the forward end of the bridge plate 1 an extension 12 is provided, which has a support member 13 that can be supported on the vehicle when the extension 12 is extended into its extended position. When loading is finished, the extension 12 is retracted into its initial position. For displacing the extension 12 a working cylinder is provided which is illustrated at 12'. A leg 14 projects perpendicularly to the support member 13. Toward the rear the support member 13 has a transition into a plate 16 which is provided with longitudinal slots 15. These slots are penetrated by the bearing members 8. The plate sections 21 of the plate 16 which are positioned between the longitudinal slots 15 are supported by longitudinal support beams 17 which project past the rear end of the plate 16.

With their front end the longitudinal support beams 17 rest on a pivotable transverse shaft 18 that is supported on the cross beam 11 in bearing blocks (not illustrated), but it can also be supported with its end portions on the metal side plates 10. As is illustrated in FIG. 3, the shaft 18 also penetrates the bearing members 8. In the rear area the longitudinal support beams 17 rest on a transverse round bar 19. There, as well as on the shaft 18, spacing sleeves 20 are provided for laterally guiding the longitudinal support beams 17.

According to FIG. 1, the forward end of the bridge plate 1 is secured by support legs 22, namely by one support leg 22 at one corner of the bridge plate 1 and the second support leg 22 at the opposite corner. At the lower end the support legs rest with a concave footing member 23 on a bearing 24 that is located at the base of the cutaway portion 7. With their upper end face 25 the support legs 22 support the cross beam 11. By this means the loading bridge is secured against lowering when the sheet metal cover 4 is being traveled.

The support legs 22 are relatively short since among all members of the bridge plate 1 the cross beam 11 extends farthest downwardly into the direction of the above mentioned base of the cutaway portion 7. A tube is sufficient as a support leg member.

At the upper section of the support legs 22 a sleeve 26 is provided which a holding member 28 engages for securing and swiveling the support legs 22 in the direction of the arrow 27; the holding member 28 is mounted on a spacing sleeve 20 which is fixedly connected to the transverse shaft 18.

Beneath the bridge plate 1, approximately positioned centrally at the forward end of the bridge plate 1, another spacing sleeve 20' is provided that is fixedly connected to the shaft 18; this spacing sleeve 20' is engaged by a positioning lever 29 that in the rest position extends upwardly. At its free end a roller 30 is provided such that a swiveling movement of the positioning lever 29 forwardly toward the extension 12 results in the swiveling of the support legs 22 in the direction of the arrow 27.

In order for this swiveling movement to be carried out automatically together with the extending movement of the extension 12, one plate section 21 is provided with a downwardly projecting beam 31 that has a slanted contact section at its front. When the extension 12 is displaced forwardly, the projecting beam 31 effects a swiveling movement of the positioning lever 29. Thus, the desired swiveling movement of the support legs 22 in the direction of the arrow 27 is carried out; then, the bridge plate 1 can slide deeply into the cutaway portion 7 without being hindered by the support legs 22.

According to FIGS. 1 and 3 the projecting beam 31 is designed as a bar that extends in the longitudinal direction of the bridge plate 1; it is provided with the same height over its entire length and has a slanted contact section 32 only at its front end. The roller 30 is being pressed against the lower edge of the bar 31; this pressure is practically created by the weight of the support leg 22 and the holding member 28, respectively, by the resulting torque (if the counter momentum caused by the holding member is disregarded).

Of further importance is the fact that the support legs 22, once they are swiveled backwardly, can swivel further upwardly if they hit a possible obstacle within the cutaway portion 7 since the projecting beam 31 prevents the support legs 22 form folding downwardly but cannot prevent a further swiveling movement of the support legs 22 in the direction of the arrow 27. But the weight of the support leg 22 always pulls the roller 30 against the projecting beam 31 in case that the resistance, respectively, the obstacle within the cutaway portion 7, is no longer present.

The sleeve 26 provides the possibility of adjusting the height of the support legs 22.

When the extension 12 is retracted, the support legs 22, due to their specific gravity, swivel back into the rest position according to FIG. 1 counter to the direction of the arrow 27. However, if, for example, because of friction a return movement is not carried out, a stop 35 will act which can be designed so as to be elastically yielding. This stop 35 is arranged between the leg 14 and the positioning lever 29 and its contours are illustrated by a broken line in FIG. 1. If the support leg 22 thus is unintentionally in an oblique position and the extension 12 is retracted under these conditions, then the stop 35 hits the roller 30. This results in a swiveling movement counter to the direction of the arrow 27, and the support leg 22 then swivels back into the vertical position in order to lower the bridge plate 1, respectively, to insert the footing member 23 into the bearing 24.

The transverse shaft 18, therefore, has the particular advantage that it effects the actuation of the swiveling of the support legs 22, on the one hand, and, on the other hand, acts as a support for the extension 12. In this respect it performs two functions.

The present invention is, of course, in no way restricted to the specific disclosure of the specification, examples, and drawings, but also encompasses any modifications within the scope of the appended claims.

What we claim is:

1. A loading bridge for ramps, said loading bridge comprising:
    a bridge plate having a forward and a rearward end and connected with said rearward end to the ramp so as to be pivotable about a horizontal axis;
    an extension connected to said forward end of said bridge plate so as to be extendable from an initial position into an extended position for supporting said bridge plate on a vehicle to be loaded and unloaded and retractable from said extended position into said initial position;
    at least one support leg with an upper and a lower end for supporting said bridge plate in a rest position, said at least one support leg pivotably connected with said upper end to said bridge plate such that said lower end swivels upwardly toward the rearward end of the bridge plate when said extension is extended;
    said at least one support leg comprising a positioning lever and said extension comprising a downwardly projecting beam, wherein upon extending said extension said positioning lever is loaded by said downwardly projecting beam such that said positioning lever is pivoted together with said at least one support leg into a folded position;
    wherein in said folded position said positioning lever rests on said downwardly projecting beam; and
    wherein said downwardly projecting beam has such a length that said at least one support leg is secured against returning into said rest position over the entire travel length of said extension from said initial position into said extended position.

2. A loading bridge according to claim 1, comprising at least two said support legs and further comprising a transverse shaft extending parallel to said forward and said rearward ends of said bridge plate, wherein said positioning lever is connected to said transverse shaft and wherein said at least two support legs are fixedly connected to said transverse shaft.

3. A loading bridge according to claim 1, wherein said downwardly projecting beam is in the form of a bar.

4. A loading bridge according to claim 1, wherein said downwardly projecting beam extends in the longitudinal direction of said bridge plate and comprises a slanted contact section for engaging said positioning lever.

5. A loading bridge according to claim 1, wherein said positioning lever has a free end with a roller.

6. A loading bridge according to claim 2, further comprising a cross beam positioned at said forward end of said bridge plate for stiffening said loading bridge, wherein said transverse shaft is supported at said cross beam.

7. A loading bridge according to claim 6, comprising two said support legs, wherein said positioning lever is positioned centrally on said transverse shaft and wherein a first one of said support legs is connected to one end of said transverse shaft and a second one of said support legs is connected to the other end of said transverse shaft.

8. A loading bridge according to claim 1, wherein in said folded position a pressing of said positioning lever against said downwardly projecting beam is achieved substantially by a weight force of said at least one support leg.

9. A loading bridge according to claim 1, wherein in said rest position of said at least one support leg said positioning lever extends substantially parallel to said at least one support leg on a side of said transverse shaft opposite said at least one support leg.

10. A loading bridge according to claim 1, wherein a length of said downwardly projecting beam is at least equal to said travel length of said extension from said initial position into said extended position.

11. A loading bridge according to claim 1, further comprising a stop for said positioning lever, said stop connected to said extension on a side of said positioning lever remote from said downwardly projecting beam, wherein said stop, upon retracting said extension, impacts said positioning lever and pivots said positioning lever such that said at least one support leg is returned from said folded position into said rest position.

12. A loading bridge according to claim 11, wherein said stop is an elastic stop.

13. A loading bridge according to claim 11, wherein said extension comprises a rearward, vertical leg and wherein said stop is connected to a said rearward, vertical leg.

* * * * *